United States Patent Office 3,489,598
Patented Jan. 13, 1970

3,489,598
METALLIC HYDROXIDE SIZED POLYURETHANE FOAM AND PROCESS FOR PRODUCING SAME
Joseph Winkler, Hazleton, Pa., assignor, by mesne assignments, to Tenneco Chemicals, Inc., a corporation of Delaware
No Drawing. Filed Sept. 12, 1966, Ser. No. 578,470
Int. Cl. B32b 27/40, 3/12; C08j 1/30
U.S. Cl. 117—98                                    8 Claims

ABSTRACT OF THE DISCLOSURE

Process for preparing sized polyurethane foams of open cell structure by initially impregnating the foam with an alkali metal aluminate, stannate or zincate, drying and thereafter curing by heating at about 250° F. to 350° F. for about 5 to 60 minutes.

---

This invention relates to novel cellular polyurethane products and to the method for preparing the same.

Cellular polyurethanes, which are generally produced by the reaction of an organic polyisocyanate with a compound having two or more isocyanate-reactive functional groups, are materials which have found a wide range of utility. In particular, cellular polyurethanes having a substantially open-celled structure are useful as filters, cushioning materials, garment linings, decorative items and the like. Open-celled cellular polyurethanes are those wherein a high percentage of the cells in the foam structure are free of cell-separating members and form a series of interconnected passageways. Such foams are especially versatile because of their porosity which permits them to be impregnated with various materials.

It is also desirable that cellular polyurethanes have a high degree of heat resistance and aging stability. The former requires that the foam not soften and lose its elastic memory, tensile strength and tear strength when stored or used at high temperatures, of the order of 100° C. or higher. Aging stability is the ability to withstand conditions of high temperatures in a humid atmosphere without the impairment of elasticity, tear strength and tensile strength.

These desirable properties are generally produced by preparing foams having an isocyanate index greater than about 110 and preferably 120 to 130. Isocyanate index is the molar ratio of isocyanate groups to hydroxyl groups, multiplied by 100. However, foams prepared at these higher isocyanate indexes do not compare favorably with those prepared at a lower value, say 100 to 105, in terms of tensile strength, elongation, tear resistance, and hand. Although the higher index foams give better heat resistance and aging stability, these advantages are largely off-set by their harsher, stiffer hand, low tensile and tear strength and low elongation.

It is a feature of this invention that high isocyanate index foams can be treated so as to improve greatly their tear strength, tensile strength, hand and elongation without loss of the desired heat resistance and aging stability. The novel products of the invention are prepared by sizing the foams with a metallic hydroxide which is permanently retained within the foam structure, apparently by hydrogen bonding. The preferred procedure for sizing the products comprises intimately contacting the foams with a solution of a soluble metallate compound of the desired metal hydroxide under relatively mild conditions converting the metallate in situ to the corresponding hydroxide, and fixing the hydroxide in the cellular structure.

In accordance with the process described herein, novel products are produced in which a metallic hydroxide is uniformly and permanently distributed in the foam structure, giving the product foams a characteristic luster and improved physical properties. These products and the process for preparing them are to be distinguished from prior art techniques and products wherein a polyurethane foam is subjected to the action of strongly alkaline reagents under comparatively strenuous conditions of temperature, contact time and concentration. Such treatments are intended to and do result in hydrolysis and removal of substantial quantities of the original foam structure, typically up to 50% thereof, and do not leave a residual body of metallic hydroxide dispersed in the foam. In distinction, the process of this invention causes, at most, only very slight weight losses, generally not greater than about 10%, and often results in a weight gain of as much as 10%.

According to certain of its aspects, the process of this invention comprises intimately contacting a cellular polyurethane with a solution of an alkali metal metallate of a metal having a water-insoluble hydroxide for a period of time less than the time required to hydrolyze a substantial portion, say 10% by weight of said cellular polyurethane and at a temperature below about 75° C.; separating said cellular polyurethane from said solution; and fixing the metal of said metallate in said cellular polyurethane in the form of its insoluble hydroxide preferably by heating.

The cellular polyurethane employed in the practice of this invention can be any of those which are available to those skilled in the art. The preferred cellular polyurethanes are those derived from the reaction of an organic polyisocyanate with an organic polyester or polyether having at least two available isocyanate-reactive groups, preferably hydroxyl groups, in the presence of a blowing agent such as water or an inert gas, one or more suitable catalysts and cell-modifiers, cell stabilizers, gas-formers, dyes, plasticizers, fillers, and the like.

As examples of organic polyisocyanates, there may be mentioned such compounds as arylene diisocyanates or triisocyanates, typically tolylene diisocyanate, phenylene diisocyanate, tolylene triisocyanate, benzidine diisocyanate, naphthalene diisocyanate, and aliphatic polyisocyanates, typically hexamethylene diisocyanate, 4,4'-methylene bis(cyclohexyl isocyanate), decamethylene diisocyanate, etc. The preferred polyisocyanates are the arylene and particularly the commercially available 80–20 mixture of 2,4- and 2,6-tolylene diisocyanate.

The preferred cellular polyurethanes are those prepared from polyesters since these are most readily obtained in the desired open-pored form. However, open-pored polyether foams can also be made, for example by explosively opening the cells of an originally closed-cell foam, and are useful as thus modified.

The polyethers most typically employed to form polyurethane foams are polyalkylene polyethers prepared by polymerizing an alkylene glycol or alkylene oxide. Such polyethers include polyethylene glycol, polypropylene glycol, polytetramethylene glycol; copolymers of glycols with triols such as 1,2,6-hexanetriol glycerine, or trimethylol propane; copolymers of two or more oxides, such as ethylene oxide-propylene oxide copolymers, etc. Illustrative polyesters include those prepared by reacting ethylene glycol, propylene glycol, tetramethylene glyco, hexanetrio, trimethylol propane and polymers thereof with dicarboxylic acids such as those derived from castor oil, tall oil fatty acids, and other fatty acids; or dicarboxylic acids such as adipic acid, succinic acid, maleic acid, phthalic acid, etc.

For ease of treatment, it is preferred that the cellular polyurethane to be treated be of substantially open-pore construction, e.g. at least about 70% of the cells should be interconnected and communicate with the exterior of the foam. Such foams are prepared by known techniques.

It is an additional advantage of this invention that substantially all of the cell-separating membranes which are present in an initial polyester foam break and recede to the cell walls during the treatment described herein so that the final product is highly porous and of true open-cell construction. The invention is particularly applicable to high isocyanate index foams, typically those having an index of 110 or higher.

The initial step of the process of the invention involves intimately contacting the cellular polyurethane with a solution of an alkali metal metallate, i.e. the water-soluble akali metal salts, such as sodium, lithium, potassium, cesium, and rubidium salts of metallates of a metal having a water-insoluble hydroxide. The useful metallates are those of aluminum, tin and zinc, i.e. the aluminates, zincates, stannates, and the like. Illustrative alkali metal metallates include sodium aluminate, potassium aluminate, lithium aluminate, sodium stannate, potassium stannate, lithium stannate, sodium zincate and potassium zincate. Sodium salts and aluminate salts are preferred and sodium aluminate is highly preferred. The alkali metal metallates may be used in any available form including anhydrous or hydrated salts.

The preferred alkali metal metallates are water-soluble and are preferably employed in the form of aqueous solutions. Other solvents which are compatible, such as ethyl alcohol, may also be present. Overly high concentrations of the alkali metal metallate in the treating solution are generally avoided to insure against undesirable hydrolysis of the foam structure. In general, concentrations not greater than about 20% by weight, and preferably 2–20%, say 10% are employed. Such aqueous solutions readily wet and penetrate the foam and shrink and remove any residual cell membranes without unduly attacking the foam when used as directed herein.

Intimate contact between the foam and the treating solution is effected by any convenient means. Immersing the foam in the treating solution while subjecting it to periodic compression and relaxation is the preferred technique in that it ensures complete impregnations and mechanically ruptures many of the residual cell membranes. However, simple immersion, drenching or the like is also possible.

Excessive temperatures are avoided to prevent appreciable hydrolysis of the foam during the treatment. It is generally contemplated that the treatment temperature will not be greater than about 75° C.

Contact between the foam and the treating solution will be maintained for a period of time which is less than the time required to cause substantial hydrolysis of the foam. Contact times not greater than about 15 minutes and typically 5–12 minutes are suitable. It will be understood that the alkali metal metallate concentration, the treatment temperature and the contact time are all interrelated factors. It is thus not possible to fix precise values for each, the ultimate criterion being that the combination of all three be such that there are essentially no residual cell-separating membranes and the metallate is deposited on the cell structure but the foam is not appreciably hydrolyzed. The proper choice of variables is readily determined for any given system by treating under various conditions and determining the weight loss or gain in the final product. In general, it is considered that the conditions are appropriate if there is a weight gain, or loss which does not exceed about 10%, and preferably 5%, of the original foam.

After the foam and the treating solution have been in contact for the desired length of time, the foam is separated from the solution. Wringing the foam or squeezing it between rollers is helpful in removing excess treating solution. Blotting, centrifuging, or blowing with air are also useful.

After removal from the treating solution, it is believed that the metallate moiety is loosely bound to the available surface of the foam structure. It is preferred, but not essential, that the alkali metal cation be substantially removed from the treated foam by any technique which does not also substantially remove the bound metallate. Rinsing with moderate-to-small amounts of water is the preferred technique. The amount of water used will vary, depending upon whether rinsing is affected in a batch or continuous process. Rinsing may be deemed complete when the foam contains the desired ash content or when the rinse water is found to have a pH below about 9. The water employed may be essentially pure or may be made slightly acidic, preferably by the addition of a small amount of an ammonium salt of a volatile organic acid, say ammonium acetate. The ammonium ion aids in displacing the alkali metal cation and is later removed by volatilization. The use of relatively cold water, say 5–40° C. is preferred. Rinsing of the foam can be effected by any convenient technique such as immersing, drenching, elution, etc., with or without mechanical compression and relaxation.

After rinsing, excess water is mechanically removed and the foam is dried, suitably by use of a current of warm, dry air which may be blown through the porous body. Air temperatures of about 150–220° F. give rapid and satisfactory drying.

Finally, the loosely bound metal hydroxide is fixed within the foam structure in order to develop the desired physical properties and provide a durable sizing coating. The most convenient method of fixing is by heating at a temperature high enough to drive off any residually bound water but below the temperature at which the foam begins to degrade. It has been found that temperatures of the order of about 250° F. to 350° F. are satisfactory. Any convenient heat source such as forced hot air, infrared heaters, ultrasonic or dielectric heating may be used. The curing time may be varied over a fairly broad range, say 5 to 60 minutes. Substantially shorter times may not be sufficient to produce the desired degree of fixing and substantially longer times do not generally provide any additional improvement.

The product obtained after fixing is a substantially open-celled cellular polyurethane having a durable coating of metal hydroxide sizing over substantially the entire available surface thereof. The term "metal hydroxide" is used for convenience, it being understood that the precise structure thereof may be somewhat altered because of bonding to the foam structure. The metal hydroxide will typically constitute about 1 to 20% and preferably 5 to 10% of the total weight of the product. It will have, when compared to the original foam from which it was prepared, one or more of the following improvements and characteristics: higher gloss; more porous structure; better hand; greater tensile strength; greater tear strength; and greater elongation. It will also have a density which is no more than about 10% less than, and preferably no more than 5% less than, that of the original foam, and some embodiments may have a density which is as much as 10% greater than that of the original foam. The final product will generally have heat resistance and aging stability at least equal to the original. In addition, many of the products show an enhanced receptivity toward further coatings and impregnants, including plastics such as polyvinyl chloride dispersions and metallized plastic emulsions. The improved properties of the products of this invention make them highly useful as filter materials for air purification; removal of suspended particles from gases; gas-liquid contact media; contour-cast products; rug pads; mats; artificial sponges and scouring devices; insulating materials; mattresses, pillows, and cushions and upholstery paddings; garment linings; etc.

The following specific examples are provided to illustrate practice of the invention and the novel products prepared thereby. Although the invention has been described herein by reference to specific embodiments, it will be understood that it is not limited thereto but comprehends all modifications and variations which fall within its general scope.

EXAMPLE 1

On a foam production machine, at mixing speed of 3500 r.p.m. and mixing chamber to discharge nozzle restriction ratio of 100 to 12, the following polyurethane polyester formulation is foamed:

| | Wt. percent |
|---|---|
| Polydiethylene glycol adipate of an average molecular weight of 2,000 available under the trademark of Fomrez 50 | 100 |
| Toluene diisocyanate (80:20) (isocyanate index of 120) | 53.7 |
| Water | 3.8 |
| Silicone emulsifier [1] | 1.0 |
| N-ethyl morpholine catalyst | 1.5 |
| N-cetyl dimethyl amine catalyst | 0.6 |
| Yellow pigmented paste [2] | 2.2 |

[1] Copolymer of propylene and ethylene oxides with dimethyl siloxane sold under the designation Union Carbide L-532.
[2] Prepared by pasting 10 parts of yellow pigment with about 90 parts of tricresyl phosphate.

The resulting yellow colored polyester polyurethane foam has the following average properties:

| | |
|---|---|
| Density, lbs./in.$^3$ | 1.60 |
| Cell count, cells/in. | 10 |
| Tensile strength, lbs./in.$^2$ | 8.1 |
| Elongation percent | 87.0 |
| Tear strength, lbs./in. | 1.4 |

This coarse foam is treated with a 10% aqueous solution of sodium aluminate at 70° C. by submerging the foam in the solution and repeatedly compressing-relaxing the foam in this bath for 10 minutes. Thereafter, the foam is separated from the solution by winging in a tight wringer. The wet foam is then immersed into cold water to remove sodium ion while leaving as much as possible of the metal hydroxide bonded to the foam surface.

While foam is immersed in cold water, it is repeatedly compressed and relaxed. It is then removed from the water, the excess water is squeezed out. The still wet foam is dried to constant weight at 200° F. and finally placed into an oven kept at 300° F. (151° C.) and cured in an infra-red oven and blowing air through the foam at the same temperature for 15 minutes. This curing step apparently helps the aluminum hydroxide to bond to the polyurethane foam surface to a glaze-like coating, exhibiting a lustrous sized skin.

The resulting sized foam is again tested and found to have the following properties:

Density, lbs./in.$^3$—1.63 or 3% increase
Cell count, cells/in.—10 or no change
Tensile strength, lbs./in.$^2$—12.5 or 54% increase
Elongation, percent—223 or 156% increase
Tear strength, lbs./in.—2.9 or 110% increase
Open cell—97–98%

This sized foam of improved properties is useful for making filters for air conditioners.

EXAMPLE 2

On a foam production machine, at a mixing speed of 4000 r.p.m. and mixing chamber to discharge nozzle restriction ratio of 100 to 50 the following polyurethane polyester formulation is foamed:

| | Weight percent |
|---|---|
| Polydiethylene glycol adipate as in Example 1 | 100 |
| Toluene diisocyanate (80:20), index 126 | 55.2 |
| Water | 3.7 |
| Antioxidant sold under the trademark Ionol | 0.75 |
| Emulsifier-amine derivative of monocarboxylic fatty acids sold under the trademark Witco 1058 | 1.3 |
| Emulsifier-mixture of polyalcohol carboxylic acid esters and oil-soluble sulfonates sold under the trademark Witco 7756 | 1.2 |
| N-cetyl dimethyl amine catalyst | 0.3 |
| N-ethyl morpholine catalyst | 1.5 |
| Pink pigmented plastic paste [1] | 1.02 |

[1] Prepared by pasting 10 parts of pink pigment with about 90 parts of tricresyl phosphate.

The resulting pink colored polyester polyurethane foam has the following average properties:

| | |
|---|---|
| Density, lbs./in.$^3$ | 2.00 |
| Cell count, cells/in. | 35 |
| Tensile strength, lbs./in.$^2$ | 17.3 |
| Elongation percent | 160 |
| Tear strength, lbs./in. | 2.1 |

This medium-celled foam is treated with a 10% aqueous solution of potassium stannate ($K_3SnO_3$) by immersing the foam in the solution, kept at 75° C., while repeatedly kneading the foam for 12 minutes. The excess liquid is wrung out and the foam is immersed into cold water to remove potassium ion. After one minute, the foam is wrung, dried with hot air at 200° F. to constant weight, and cured for 15 minutes at 300° F.

The resulting sized open-pore foam is again tested and found to have the following properties:

Density, lbs./in.$^3$—1.91 or 4.5% decrease
Cell count, cells/in.—35 or no change
Tensile strength, lbs./in.$^2$—29.2 or 70% increase
Elongation, percent—309 or 93% increase
Tear strength, lbs./in.—5.1 or 143% increase
Open cell—97–98%

EXAMPLE 3

The pink colored polyester polyurethane foam used in Example 2 is treated with a 10% aqueous solution of sodium aluminate ($NaAlO_2$) by immersing the foam in the solution at a temperature of 60–65° C., while repeatedly kneading it for 10 minutes. The treated foam is then further processed as described in Example 2. The resulting sized open-pore foam is tested and found to have the following properties:

Density, lbs./in.$^3$—2.07 or 3.5% increase
Cell count, cells/in.—35 or no change
Tensile strength, lbs./in.$^2$—35.7 or 104% increase
Elongation, percent—476 or 200% increase
Tear strength, lbs./in.—4.35 or 110% increase This moderately sized foam thus exhibits improved physical properties over the product of Example 2 and can be used in the same manner.

EXAMPLE 4

On a foam production machine, at a mixing speed of 5400 r.p.m. and no restriction between mixing chamber and exit nozzle, the following polyurethane polyester formulation is foamed:

| | Weight percent |
|---|---|
| Polydiethylene glycol adipate as in Example 1 | 100.0 |
| Toluene diisocyanate (80:20), index 112 | 49.0 |
| Water | 3.7 |
| Silicone emulsifier as in Example 1 | 1.2 |
| Stannous octoate | 0.4 |
| N-cetyl dimethyl amine catalyst | 0.4 |
| N-ethyl morpholine catalyst | 1.5 |
| Blue pigment plasticized paste [1] | 0.003 |

[1] Prepared by pasting 10 parts of blue pigment with about 90 parts of tricresyl phosphate.

The resulting white dense polyetser polyurethane foam has the following average properties:

| | |
|---|---|
| Density, lbs./in.$^3$ | 1.7 |
| Cell count, cells/in. | 70 |
| Tensile strength, lbs./in.$^2$ | 30.5 |
| Elongation percent | 376 |
| Tear strength, lbs./in. | 3.7 |

This fine-celled foam is treated with a 10% aqueous solution of sodium aluminate (NaAlO$_2$) in the same manner as described in Example 1, but at a treating temperature of only 60° C. and a treating time of 12 minutes. Otherwise the following operations involving washing with cold water, drying and curing are the same as those of Example 1.

The resulting sized open-pore foam exhibits the following changes in properties:

Density, lbs./in.$^3$—1.65 or 3% decrease
Cell count, cells/in.—70 or no change
Tensile strength, lbs./in.$^2$—37 or 21% increase
Elongation, percent—574 or 53% increase
Tear strength, lbs./in.—4 or 8% increase This sized fine-celled, sized, white foam has considerably improved properties when compared to the initial foam and is particularly useful in garment linings.

EXAMPLE 5

On a foam production machine, at a mixing speed of 5400 r.p.m. and no outlet restriction, the following polyester polyurethane formulation is formed:

| | Wt. percent |
|---|---|
| Polydiethylene glycol adipate as in Example 1 | 100 |
| Toluene diisocyanate (80:20) at 117 index | 50.2 |
| Water | 3.6 |
| Proprietary emulsifier as in Example 2 | 1.4 |
| Proprietary emulsifier as in Example 2 | 1.3 |
| Antioxidant, sold under the trademark Ionol | 0.75 |
| N-ethyl morpholine catalyst | 1.5 |
| N-cetyl dimethyl amine catalyst | 1.2 |
| N-coco morpholine catalyst | 1.0 |
| Cell opener: White oil[1] | 0.2 |

[1] Purified naphthenic oil.

The resulting white highly elastic, slightly stiff foam has the following average properties:

Density, lbs./in.$^3$ _____ 1.91
Cell count, cells/in. _____ 45
Tensile strength, lbs./in.$^2$ _____ 27.9
Elongation percent _____ 230
Tear strength, lbs./in. _____ 2.36

This foam is treated with a 10% aqueous solution of sodium aluminate at 75° C. for 8 minutes by the procedure described in Example 1, then washed and cured for 15 minutes at 300° F. as described in Example 2. The sized open-pore foam is again tested and found to have the following properties:

Density, lbs./in.$^3$—1.98 or 3.7% increase
Cell count, cells/in.—45 or no change
Tensile strength, lbs./in.$^2$—32.7 or 17% increase
Elongation percent—422 or 84% increase
Tear strength, lbs./in.—3.83 or 62% increase
Open cell—97–98%

This improved open-pore, white foam is a good filtering and straining foam.

What is claimed is:

1. The process for preparing sized foams which comprises intimately contacting a cellular polyurethane having at least about 70% open cells with a 2% to 20% aqueous solution of at least one alkali metal metallate selected from the group consisting of alkali metal aluminates, stannates and zincates at a temperature less than about 75° C. for a period of from about 5 to about 15 minutes; separating said polyurethane from said solution; and fixing the metal hydroxide of said metallate in said polyurethane by heating at a temperature of from about 250° F. to about 350° F. for about 5 to about 60 minutes.

2. The process of claim 1 wherein said polyurethane is a polyester polyurethane.

3. The process of claim 1 wherein said polyurethane has an isocyanate index greater than 110.

4. The process of claim 1 wherein said polyurethane is washed with water to remove alkali metal therefrom prior to fixing said metal hydroxide.

5. The process of claim 1 wherein said alkali metal metallate is sodium aluminate.

6. A sized cellular polyurethane comprising a substantially open celled cellular polyurethane having a fixed coating of metal hydroxide over the available surface thereof, said metal hydroxide being a water-insoluble hydroxide of a metal having a water soluble alkali metal metallate selected from the group consisting of alkali metal aluminates, stannates and zincates.

7. The cellular polyurethane of claim 6 wherein said metal hydroxide constitutes between about 1 and 20% by weight of said sized cellular polyurethane.

8. The cellular polyurethane of claim 6 wherein said metal hydroxide is aluminum hydroxide.

References Cited

UNITED STATES PATENTS 1,379,858  11/1921  Craig _____ 117—136
2,900,278  8/1959  Powers et al. _____ 117—98

ALFRED L. LEAVITT, Primary Examiner

CHARLES R. WILSON, Assistant Examiner

U.S. Cl. X.R.

117—138.8, 169